United States Patent
Kim et al.

(10) Patent No.: US 10,135,094 B2
(45) Date of Patent: Nov. 20, 2018

(54) ELECTROLYTE FOR LITHIUM SECONDARY BATTERY AND LITHIUM SECONDARY BATTERY CONTAINING THE SAME

(71) Applicant: SK INNOVATION CO., LTD., Seoul (KR)

(72) Inventors: Jin Sung Kim, Daejeon (KR); Seong Il Lee, Daejeon (KR); Kwang Kuk Lee, Daejeon (KR); Jin Su Ham, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 390 days.

(21) Appl. No.: 14/577,626

(22) Filed: Dec. 19, 2014

(65) Prior Publication Data
US 2015/0180087 A1    Jun. 25, 2015

(30) Foreign Application Priority Data

Dec. 19, 2013 (KR) .................. 10-2013-0159449
Oct. 21, 2014 (KR) .................. 10-2014-0142556

(51) Int. Cl.
*H01M 10/052* (2010.01)
*H01M 10/0567* (2010.01)
*H01M 10/42* (2006.01)

(52) U.S. Cl.
CPC ...... *H01M 10/0567* (2013.01); *H01M 10/052* (2013.01); *H01M 10/4235* (2013.01); *H01M 2300/0025* (2013.01)

(58) Field of Classification Search
CPC ........... H01M 10/052; H01M 10/0567; H01M 10/4235; H01M 2300/0025
See application file for complete search history.

(56) References Cited

U.S. PATENT DOCUMENTS 5,879,834 A      3/1999   Mao
2014/0023941 A1*  1/2014  Amine .............. H01M 10/0568
                                                              429/405

FOREIGN PATENT DOCUMENTS

JP        2002-260725          9/2002
WO    WO 2012138844 A2 *  10/2012   ........ H01M 10/0568

OTHER PUBLICATIONS

Qin, Y., et al. "Effect of Anion Receptor Additives on Electrochemical Performance of Lithium-Ion Batteries", Journal of Physical Chemistry C, vol. 114, pp. 15202-15206, published Aug. 18, 2010. (Year: 2010).*

* cited by examiner

Primary Examiner — Miriam Stagg
Assistant Examiner — Lilia Nedialkova
(74) Attorney, Agent, or Firm — IP & T Group LLP

(57) ABSTRACT

Provided are an electrolyte for a lithium secondary battery and a lithium secondary battery containing the same.

14 Claims, No Drawings

ELECTROLYTE FOR LITHIUM SECONDARY BATTERY AND LITHIUM SECONDARY BATTERY CONTAINING THE SAME

CROSS-REFERENCE TO RELATED APPLICATIONS

This application claims priority under 35 U.S.C. § 119 to Korean Patent Application No. 10-2013-0159449, filed on Dec. 19, 2013 and Korean Patent Application No. 10-2014-0142556, filed on Oct. 21, 2014, the disclosure of which is herein incorporated by reference in its entirety.

TECHNICAL FIELD

Embodiments relate to an electrolyte for a lithium secondary battery and a lithium secondary battery containing the same. More particularly, embodiments relate to an electrolyte for a lithium secondary battery containing a boron derivative, and a lithium secondary battery containing the same.

BACKGROUND

Rapid miniaturization of portable electronic devices has resulted in an increased demand for a battery used as a power supply in the portable electronic devices to be lighter and thinner. Furthermore, development of a secondary battery having a small size, being lightweight, being charged and discharged for a long period of time, and having excellent high rate characteristics has been demanded.

A lithium secondary battery developed in the early 1990s has been spotlighted due to advantages such as, a high operation voltage and significantly high energy density as compared to a battery using an aqueous electrolyte such as, a Ni-MH battery, a Ni—Cd battery, a lead sulfate battery, and the like. However, in the lithium secondary battery, there can be safety issues such as, ignition and explosion of a non-aqueous electrolyte. As a capacity density of the battery is increased, this problem becomes more severe.

In a non-aqueous electrolyte secondary battery an issue may arise such as, safety deterioration of the battery which occurs at a time of continuous charge. One of the causes is heat generation due to collapse of a cathode structure. That is, a cathode active material of a non-aqueous electrolyte battery includes lithium, a lithium-containing metal oxide capable of intercalating and releasing lithium ions, and/or the like. As a large amount of lithium is detached at the time of over-charge, a structure of the cathode active material is changed to a thermally unstable structure. In this overcharge state, when a battery temperature reaches a critical temperature due to external physical impact, for example, exposure to a high temperature, oxygen is released from the cathode active material and the released oxygen generates an exothermic decomposition reaction with an electrolyte solvent. Particularly, since combustion of the electrolyte is further accelerated by oxygen released from the cathode, the battery may be ignited or ruptured due to thermal runaway caused by a series of exothermic reactions as described above.

To suppress the above-mentioned ignition or rupture due to an increase in temperature in the battery, a method of adding an aromatic compound to the electrolyte as a redox shuttle additive has been used. For example, a non-aqueous lithium ion battery, which is capable of preventing over-charge current and a thermal runaway phenomenon caused by the over-charge current by using an aromatic compound such as biphenyl, has been disclosed in Japanese Patent No. 2002-260725, which is herein incorporated by reference in its entirety. In addition, a method of improving safety of a battery by adding a small amount of an aromatic compound such as biphenyl, 3-chlorothiophene, or the like, to increase an internal resistance by electrochemical neutralization in an abnormal over-voltage state has been disclosed in U.S. Pat. No. 5,879,834, which is herein incorporated by reference in its entirety.

However, when using an additive such as biphenyl, or the like, there are issues in that when a relatively high voltage is locally generated during a general operation voltage, the additive is gradually decomposed during a charge and discharge process. When the battery is discharged at a high temperature for a long period of time, an amount of biphenyl, or the like, may gradually decrease. Thus, safety may not be secured, for example, after 300 charge and discharge cycles. In addition, an issue with storage characteristics may arise.

Therefore, research for improving safety at high and low temperatures while still having a high capacity retention rate has been demanded.

SUMMARY

An embodiment is directed to providing an electrolyte for a lithium secondary battery capable of having excellent high temperature and low temperature characteristics while properly maintaining basic functions such as, high rate charge and discharge characteristics, lifespan characteristics, and the like, and a lithium secondary battery containing the same. In one general aspect, an electrolyte for a lithium ion battery according to an embodiment includes: a lithium salt; a non-aqueous organic solvent; and a boron derivative represented by the following Chemical Formula 1.

[Chemical Formula 1]

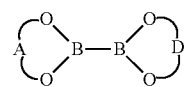

Each of A and D is independently non-substituted (C6-C12)arylene, substituted (C6-C12)arylene, non-substituted (C2-C10)alkylene or substituted (C2-C10)alkylene.

The substituted (C6-C12)alkylene is (C6-C12)alkylene of which the hydrogen atoms are partially or completely substituted with cyano, hydroxyl, halogen, halo(C1-C10)alkyl, (C1-C10)alkyl, (C1-C10)alkoxy, (C1-C10)alkoxycarbonyl, (C6-C12)aryl, or a combination thereof.

The substituted (C2-C10)alkylene excludes (C2-C10) alkylene of which all hydrogen atoms are simultaneously substituted with (C1-C10)alkyl.

The substituted (C6-C12)arylene is (C6-C12)arylene of which the hydrogen atoms are partially or completely substituted with cyano, hydroxyl, halogen, halo(C1-C10)alkyl, (C1-C10)alkyl, (C1-C10)alkoxy, (C1-C10)alkoxycarbonyl, (C6-C12)aryl, or a combination thereof.

The boron derivative represented by Chemical Formula 1 is represented by the following Chemical Formula 2.

[Chemical Formula 2]

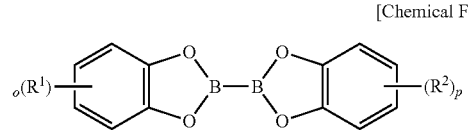

Each of $R^1$ and $R^2$ is independently hydrogen, cyano, hydroxyl, halogen, halo(C1-C10)alkyl, (C1-C10)alkyl, (C1-C10)alkoxy, (C1-C10)alkoxycarbonyl, or (C6-C12)aryl. Each of o and p is an independent integer of 1 to 4.

When o is 2 or more, the two or more $R^1$ are the same as or different from each other. When p is 2 or more, the two or more $R^2$ are the same as or different from each other. Each of $R^1$ and $R^2$ is independently hydrogen or (C1-C10)alkyl.

The boron derivative represented by Chemical Formula 1 may include the following Chemical Formula 3.

[Chemical Formula 3]

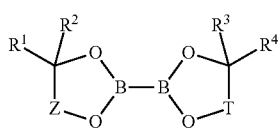

Each of $R^1$ to $R^4$ is independently hydrogen, cyano, hydroxyl, halogen, halo(C1-C10)alkyl, (C1-C10)alkyl, (C1-C10)alkoxy, (C1-C10)alkoxycarbonyl, or (C6-C12)aryl. Z is $-(CR^5R^6)_m-$. T is $-(CR^7R^8)_n-$. Each of n and m is an independent integer of 1 to 4.

Each of $R^5$ to $R^8$ is independently hydrogen, halogen, halo(C1-C10)alkyl, (C1-C10)alkyl, (C1-C10)alkoxy, (C1-C10)alkoxycarbonyl, or (C6-C12) aryl. The boron derivative excludes the material represented by the Chemical Formula 3 of which all of $R^1$ to $R^8$ are (C1-C10)alkyl.

The boron derivative represented by Chemical Formula 3 may include the following Chemical Formula 4 or 5.

[Chemical Formula 4]

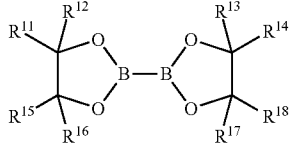

[Chemical Formula 5]

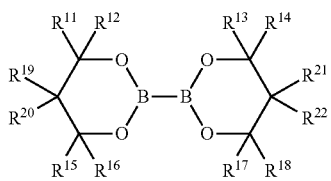

Each of $R^{11}$ to $R^{22}$ is independently hydrogen, halo(C1-C10)alkyl, (C1-C10)alkyl, or (C1-C10)alkoxycarbonyl. The boron derivative excludes the material represented by Chemical Formula 4 of which all of $R^{11}$ to $R^{18}$ are (C1-C10)alkyl. The boron derivative excludes the material represented by Chemical Formula 5 of which all of $R^{11}$ to $R^{22}$ are (C1-C10)alkyl.

The boron derivative represented by Chemical Formula 1 may include any of the followings or a combination thereof:

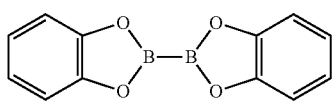

-continued

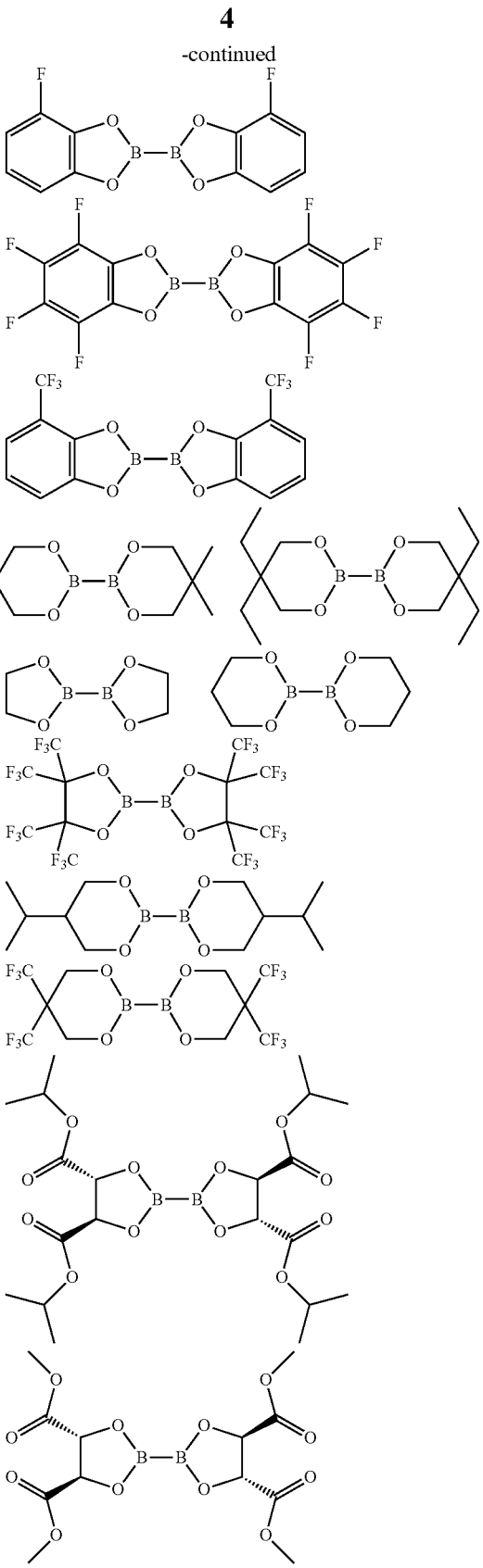

In the electrolyte according to an embodiment, the content of the boron derivative is 0.1 to 5 wt % based on the total weight of the electrolyte.

The electrolyte may further include one or more additives selected from the group consisting of oxalatoborate based compounds, carbonate based compounds, substituted with fluorine, vinylidene carbonate based compounds, and sulfinyl group containing compounds.

The electrolyte may further include a second additive selected from the group consisting of lithium difluoro(oxalate)borate (LiFOB), lithium bis(oxalato)borate (LIB (C$_2$O$_4$)$_2$, LiBOB), fluoroethylene carbonate (FEC), vinylene carbonate (VC), vinyl ethylene carbonate (VEC), divinyl sulfone, ethylene sulfite, propylene sulfite, diallyl sulfonate, ethane sultone, propane saltone (PS), butane sultone, ethene sultone, butene sultone, propene sultone (PRS), or a combination thereof.

In the electrolyte according to an embodiment, the content of the first additive is 0.1 to 5.0 wt % based on the total weight of the electrolyte.

In the electrolyte according to an embodiment, the non-aqueous organic solvent is selected from cyclic carbonate-based solvent, linear carbonate-based solvent, and a combination thereof.

In the electrolyte according to an embodiment, the cyclic carbonate-based solvent includes, as a majority component when measured based on the total weight of the non-aqueous organic solvent, a compound selected from the group consisting of ethylene carbonate, propylene carbonate, butylene carbonate, vinylene carbonate, vinyl ethylene carbonate, fluoroethylene carbonate, and a mixture thereof.

The linear carbonate-based solvent includes, as a majority component when measured based on the total weight of the non-aqueous organic solvent, a compound selected from the group consisting of dimethyl carbonate, diethyl carbonate, dipropyl carbonate, ethyl methyl carbonate, methyl propyl carbonate, methyl isopropyl carbonate, ethyl propyl carbonate, and a mixture thereof.

In the electrolyte according to an embodiment, the non-aqueous organic solvent is a mixture of the linear carbonate-based solvent and the cyclic carbonate-based solvent. The mixed volume ratio of the linear carbonate-based solvent:the cyclic carbonate-based solvent is 1 to 9:1.

The lithium salt may be LiPF$_6$, LiBF$_4$, LiClO$_4$, LiSbF$_6$, LiAsF$_6$, LiN(SO$_2$C$_2$F$_5$)$_2$, LiN(CF$_3$SO$_2$)$_2$, LiN(SO$_3$C$_2$F$_5$)$_2$, LiN(SO$_2$F)$_2$, LiCF$_3$SO$_3$, LiC$_4$F$_9$SO$_3$, LiC$_6$H$_5$SO$_3$, LiSCN, LiAlO$_2$, LiAlCl$_4$, LiN(C$_x$F$_{2x+1}$SO$_2$)(C$_y$F$_{2y+1}$SO$_2$), LiCl, LiI, LiB(C$_2$O$_4$)$_2$, or a combination thereof. Each of x and y is a natural number. The concentration of the lithium salt is 0.1 to 2.0 M.

In an embodiment, a lithium secondary battery may include the above-mentioned electrolyte for a lithium secondary battery.

DETAILED DESCRIPTION OF EMBODIMENTS

Hereinafter, embodiments will be described in more detail. A description of well-known general functions and configurations will be omitted in the following description.

Embodiments relate to an electrolyte for a lithium secondary battery that provides a battery having significantly excellent discharge capacity at a low temperature while having excellent high-temperature storage characteristics and lifespan characteristics.

Embodiments provide art electrolyte for a lithium secondary battery containing: a lithium salt; a non-aqueous organic solvent; and a boron derivative represented by the following Chemical Formula 1.

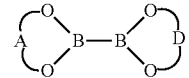

[Chemical Formula 1]

In Chemical Formula 1, each of A and D is independently non-substituted (C6-C12)arylene, substituted (C6-C12)arylene, non-substituted (C2-C10)alkylene or substituted (C2-C10)alkylene.

The substituted (C6-C12)alkylene is (C6-C12)alkylene of which the hydrogen atoms are partially or completely substituted with cyano, hydroxyl, halogen, halo(C1-C10)alkyl, (C1-C10)alkyl, (C1-C10)alkoxy, (C1-C10)alkoxycarbonyl, (C6-C12)aryl, or a combination thereof.

The substituted (C2-C10)alkylene excludes (C2-C10)alkylene of which all hydrogen atoms are simultaneously substituted with (C1-C10)alkyl.

The substituted (C6-C12)arylene is (C6-C12)arylene of which the hydrogen atoms are partially or completely substituted with cyano, hydroxyl, halogen, halo(C1-C10)alkyl, (C1-C10)alkyl, (C1-C10)alkoxy, (C1-C10)alkoxycarbonyl, (C6-C12)aryl, or a combination thereof.

As the electrolyte for a lithium secondary battery according to an embodiment contains the boron derivative, more specifically, the boron derivative represented by Chemical Formula 1, a capacity recovery rate at a high temperature may be high. In addition, a thickness change rate may be low such that the electrolyte may be more stable at a high temperature. More specifically, the boron derivative according to an embodiment is chemically stable.

In Chemical Formula 1, D may be arylene such as, a fused ring, or may be alkylene such as, a hetero ring containing two or more oxygen and boron. The boron derivative may improve high temperature and low temperature characteristics while being chemically stable.

In the electrolyte for a lithium secondary battery according to an embodiment, the boron derivative represented by Chemical Formula 1 may be represented by the following Chemical Formula 2.

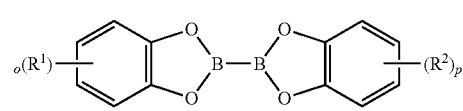

[Chemical Formula 2]

In Chemical Formula 2, each of R$^1$ and R$^2$ is independently hydrogen, cyano, hydroxyl, halogen, halo(C1-C10)alkyl, (C1-C10)alkyl, (C1-C10)alkoxy, (C1-C10)alkoxycarbonyl, or (C6-C12)aryl.

Each of o and p is an independent integer of 1 to 4. When o is 2 or more, the two or more R$^1$ are the same as or different from each other. When p is 2 or more, the two or more R$^2$ are the same as or different from each other.

The boron derivative represented by Chemical Formula 2 according to an exemplary embodiment, for example, a heteroalicyclic compound containing oxygen and boron fused with a benzene ring, may be decomposed in an anode to efficiently form a solid electrolyte interphase (SEI) layer, such that high temperature stability and low temperature characteristics may be significantly excellent.

According to an exemplary embodiment, in Chemical Formula 2, R$^1$ to R$^2$ may be each independently hydrogen or (C1-C10)alkyl.

In addition, the boron derivative represented by Chemical Formula 1 according to an exemplary embodiment may be represented by the following Chemical Formula 3.

[Chemical Formula 3]

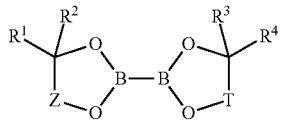

In Chemical Formula 3, each of $R^1$ to $R^4$ is independently hydrogen, cyano, hydroxyl, halogen, halo(C1-C10)alkyl, (C1-C10)alkyl, (C1-C10)alkoxy, (C1-C10)alkoxycarbonyl, or (C6-C12)aryl. Z is $-(CR^5R^6)_m-$. T is $-(CR^7R^8)_n-$. Each of n and m is an independent integer of 1 to 4.

Each of $R^5$ to $R^8$ is independently hydrogen, halogen, halo(C1-C10)alkyl, (C1-C10)alkyl, (C1-C10)alkoxy, (C1-C10)alkoxycarbonyl, or (C6-C12)aryl. The boron derivative excludes the material represented by the Chemical Formula 3 of which all of $R^1$ to $R^8$ are (C1-C10)alkyl.

The boron derivative represented by Chemical Formula 3 according to an exemplary embodiment, for example, a heteroalicyclic compound containing oxygen and boron, may be decomposed in the anode to efficiently form a solid electrolyte interphase (SEI) layer such that high temperature stability and low temperature characteristics may be significantly excellent.

In view of chemical stability and electric characteristics, the boron derivative represented by Chemical Formula 3 according to an exemplary embodiment may be preferably represented by the following Chemical Formula 4 or 5.

[Chemical Formula 4]

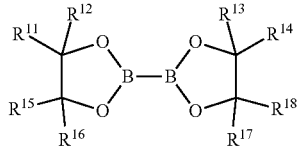

[Chemical Formula 5]

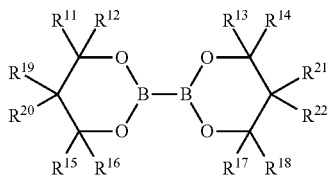

In Chemical Formulas 4 and 5, each of $R^{11}$ to $R^{22}$ is independently hydrogen, halo(C1-C10)alkyl, (C1-C10)alkyl, or (C1-C10)alkoxycarbonyl.

The boron derivative excludes the material represented by Chemical Formula 4 of which all of $R^{11}$ to $R^{18}$ are (C1-C10)alkyl. The boron derivative excludes the material represented by Chemical Formula 5 of which all of $R^{11}$ to $R^{22}$ are (C1-C10)alkyl.

In Chemical Formula 4 according to an exemplary embodiment, $R^{11}$ to $R^{18}$ may be, more preferably, hydrogen, halo(C1-C10)alkyl, or (C1-C10)alkoxycarbonyl. In Chemical Formula 5, $R^{11}$ to $R^{22}$ may be, more preferably, hydrogen or halo(C1-C10)alkyl. However, all of $R^{11}$ to $R^{22}$ are not simultaneously (C1-C10)alkyl.

In a compound in which all carbon atoms in Chemical Formulas 4 and 5 are substituted with alkyl, battery characteristics such as high temperature stability, or the like, of a lithium secondary battery using an electrolyte containing the compound were not improved.

More specifically, the boron derivative according to an embodiment may include any of the following structures, but is not limited thereto.

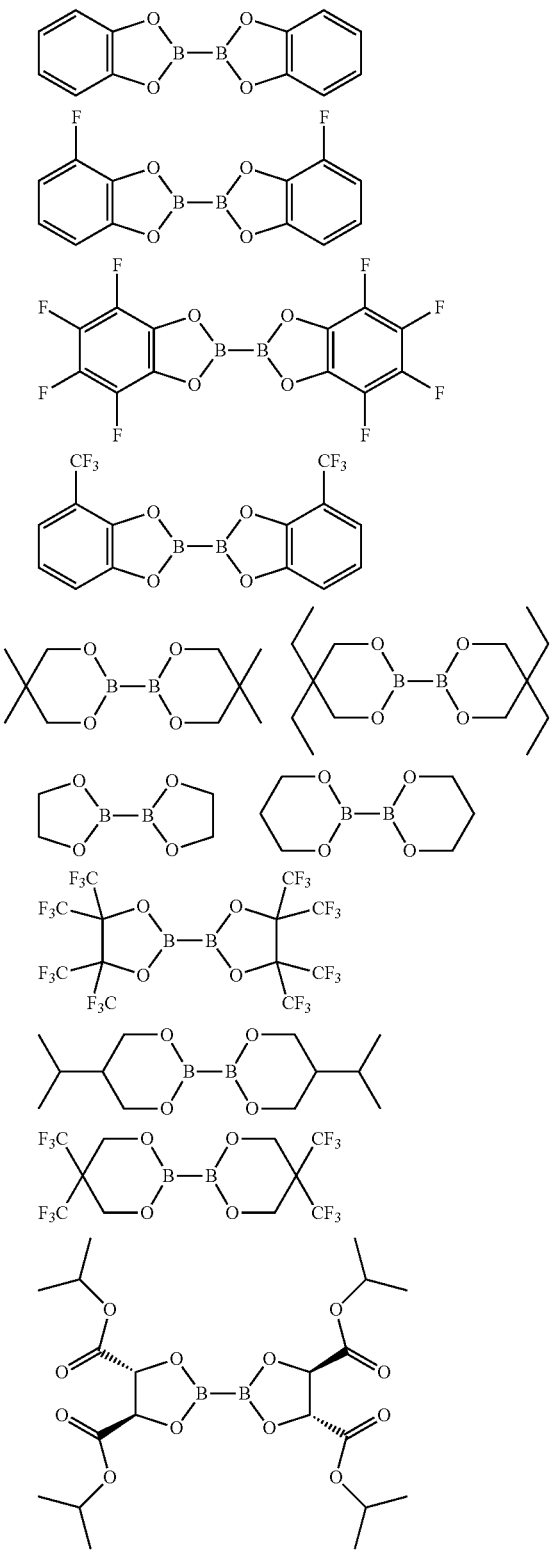

-continued

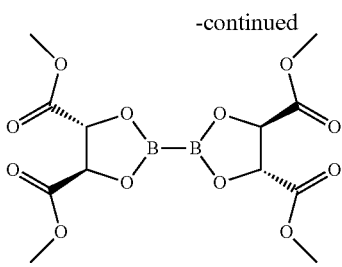

As disclosed herein, the terms ⌈alkyl⌉, ⌈alkoxy⌉, and other substituents including a ⌈alkyl⌉ part refer to both of the linear chain and the branched chain types, and have 1 to 10 carbon atoms, preferably 1 to 6 carbon atoms, more preferably 1 to 4 carbon atoms.

In addition, as disclosed herein, the term ⌈aryl⌉, which is an organic radical derived from aromatic hydrocarbon by removing one hydrogen atom therefrom, may include a single aromatic ring or a fused aromatic ring containing 4 to 7 ring atoms, and preferably 5 or 6 ring atoms in each aromatic ring, and may include a structure in which two or more aryl groups are combined through single bond(s). An example of aryl may include phenyl, naphthyl, biphenyl, anthryl, indenyl, fluorenyl, and the like, but is not limited thereto.

As disclosed herein, the term alkylene substituted with halogen or haloalkyl means that one or more hydrogen of the alkylene are substituted with halogen or haloalkyl.

In the electrolyte for a lithium secondary battery according to an exemplary embodiment, the boron derivative represented by Chemical Formula 1 may be contained at a content of 0.1 to 5 wt % based on the total weight of the electrolyte for a lithium secondary battery. In view of high temperature stability, it is more preferable that the boron derivative is contained at a content of 1 to 3 wt %. When the content of the boron derivative represented by Chemical Formula 1 is less than 0.1 wt %, additional effects such as high temperature stability, improvement of a capacity retention rate, or the like, are not exhibited, and an effect of improving discharge capacity, output, or the like, of the lithium secondary battery may be insignificant. In contrast, when the content of the boron derivative is more than 5 wt %, a lifespan, or the like, is rapidly deteriorated, such that characteristics of the lithium secondary battery may be rather deteriorated.

In the electrolyte for a lithium secondary battery according to an exemplary embodiment, the electrolyte may further contain one or more additives selected from the group consisting of oxalatoborate based compounds, carbonate based compounds substituted with fluorine, vinylidene carbonate based compounds, and sulfinyl group containing compounds as an additive for improving the lifespan of the battery.

The oxalatoborate based compound may be a compound represented by the following Chemical Formula 11 or lithium bis(oxalato)borate (LiB(C$_2$O$_4$)$_2$, LiBOB).

[Chemical Formula 11]

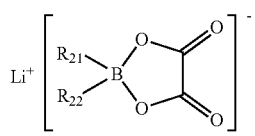

In Chemical Formula 11, R$_{21}$ and R$_{22}$ are each independently halogen or (C1 to C10)alkyl containing one or more halogen substituents.

The oxalatoborate-based compound is oxalatoborate which is partially or completely substituted with fluorine, vinylidene carbonate-based compound, sulfinyl group-containing compound, and a combination thereof. The carbonate-based compound is carbonate which is partially or completely substituted with fluorine, vinylidene carbonate-based compound, sulfinyl group-containing compound, and a combination thereof.

Specific examples of the oxalatoborate based additive may include lithium difluoro(oxalato)borate (LiB(C$_2$O$_4$)F$_2$, LiFOB), lithium bis(oxalate)borate (LiB(C$_2$O$_4$)$_2$, LiBOB), or the like.

The carbonate based compound substituted with fluorine may be fluoroethylene carbonate (FEC), difluoroethylene carbonate (DFEC), fluorodimethyl carbonate (FDMC), fluoroethyl methyl carbonate (FEMC), or a combination thereof.

The vinylidene carbonate based compound may be vinylene carbonate (VC), vinyl ethylene carbonate (VEC), or a mixture thereof.

The sulfinyl group (S=O) containing compound may be sulfone, sulfite, sulfonate, sultone (cyclic sulfonate), or a mixture thereof. In detail, sulfone may be represented by the following Chemical Formula 12 and be divinyl sulfone. Sulfite may be represented by the following Chemical Formula 13 and be ethylene sulfite or propylene sulfite. Sulfonate may be represented by the following Chemical Formula 14 and be diallyl sulfonate. In addition, non-restrictive examples of sultone may include ethane sultone, propane sultone, butane sultone, ethene sultone, butene sultone, propene sultone, and the like.

[Chemical Formula 12]

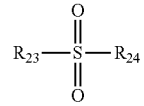

[Chemical Formula 13]

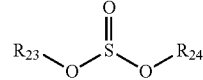

[Chemical Formula 14]

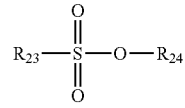

In Chemical Formulas 12 to 14, R$_{23}$ and R$_{24}$ are each independently hydrogen, halogen, (C1-C10)alkyl, (C2-C10)alkenyl, (C1-C10)alkyl substituted with halogen, or (C2-C10)alkenyl substituted with halogen.

In the electrolyte for a lithium secondary battery according to an exemplary embodiment, more preferably, the electrolyte may further contain an additive such as, lithium difluoro(oxalato)borate (LiFOB), lithium bis(oxalato)borate (LIB(C$_2$O$_4$)$_2$, LiBOB), fluoroethylene carbonate (FEC), vinylene carbonate (VC), vinyl ethylene carbonate (VEC), divinyl sulfone, ethylene sulfite, propylene sulfite, diallyl sulfonate, ethane sultone, propane sultone (PS), butane sultone, ethene sultone, butene sultone, and propene sultone (PRS). More preferably, the electrolyte may further contain lithium bis(oxalato)borate (LIB(C$_2$O$_4$)$_2$, LiBOB), vinylene carbonate (VC), vinyl ethylene carbonate (VEC), ethylene sulfite, ethane sultone, propane sultone (PS), or a combination thereof.

In the electrolyte for a lithium secondary battery according to an exemplary embodiment, a content of the additive is not particularly limited, but to improve the lifespan of the battery, the additive may be contained in the electrolyte for a lithium secondary battery at a content of 0.1 to 5 wt %, more preferably 0.1 to 3 wt %, based on the total weight of the electrolyte.

In the electrolyte for a lithium secondary battery according to an exemplary embodiment, the non-aqueous organic solvent may include carbonate, ester, ether, or ketone alone, or a mixed solvent thereof. It is preferable that the non-aqueous organic solvent includes cyclic carbonate based solvents, linear carbonate based solvents, or a mixed solvent thereof. It is more preferable to use the mixed solvent of the cyclic carbonate based solvent and the linear carbonate based solvent. The cyclic carbonate solvent may sufficiently dissociate lithium ions due to large polarity, but has a disadvantage in that ion conductivity thereof is small due to a large viscosity. Therefore, characteristics of the lithium secondary battery may be optimized by mixing a linear carbonate solvent that has a small polarity and a low viscosity with the cyclic carbonate solvent.

The cyclic carbonate based solvent may include ethylene carbonate, propylene carbonate, butylene carbonate, vinylene carbonate, vinyl ethylene carbonate, fluoroethylene carbonate, or a mixture thereof. The linear carbonate based solvent may include dimethyl carbonate, diethyl carbonate, dipropyl carbonate, ethyl methyl carbonate, methyl propyl carbonate, methyl isopropyl carbonate, ethyl propyl carbonate, or a mixture thereof.

In the electrolyte for a lithium secondary battery according to an exemplary embodiment, the non-aqueous organic solvent, which is the mixed solvent of the cyclic carbonate based solvent and the linear carbonate based solvent, a mixed volume ratio of the linear carbonate solvent and the cyclic carbonate solvent may be 1 to 9:1, preferably 1.5 to 4:1.

In the electrolyte for a lithium secondary battery according to an exemplary embodiment, the lithium salt may include $LiPF_6$, $LiBF_4$, $LiClO_4$, $LiSbF_6$, $LiAsF_6$, $LiN(SO_2C_2F_5)_2$, $LiN(CF_3SO_2)_2$, $LiN(SO_3C_2F_5)_2$, $LiN(SO_2F)_2$, $LiCF_3SO_3$, $LiC_4F_9SO_3$, $LiC_6H_5SO_3$, LiSCN, $LiAlO_2$, $LiAlCl_4$, $LiN(C_xF_{2x+1}SO_2)(C_yF_{2y+1}SO_2)$ (here, x and y are natural numbers), LiCl, LiI, $LiB(C_2O_4)_2$, or a combination thereof.

The lithium salt may be used at a concentration of preferably 0.1 to 2.0 M, and more preferably, 0.7 to 1.6 M. When the concentration of the lithium salt is less than 0.1 M, conductivity of the electrolyte is decreased and performance of the electrolyte is deteriorated. When the concentration is more than 2.0 M, the viscosity is increased and mobility of the lithium ion may be decreased. The lithium salt serves as a supply source of the lithium ion in the battery to enable a basic operation of the lithium secondary battery.

Since the electrolyte for a lithium secondary battery according to an exemplary embodiment is stable in a temperature range of −20 to 60° C., and maintains electrochemically stable characteristics even at a voltage of 4.4 V, the electrolyte may be applied to various lithium secondary batteries such as a lithium ion battery, a lithium polymer battery, and the like.

In addition, an embodiment provides a lithium secondary battery containing the electrolyte for a lithium secondary battery. A non-restrictive example of the secondary battery may include a lithium metal secondary battery, a lithium ion secondary battery, a lithium polymer secondary battery, a lithium ion polymer secondary battery, or the like.

The lithium secondary battery manufactured using the electrolyte for a lithium secondary battery according to an embodiment has high-temperature storage efficiency of 75% or more. In addition, when the lithium secondary battery is exposed to a high temperature for a long period of time, a thickness increase rate of the lithium secondary battery is significantly low (1 to 20%, more preferably 1 to 15%).

The lithium secondary battery according to an embodiment includes a cathode and an anode. It is preferable that the cathode contains a cathode active material capable of intercalating and deintercalating lithium ions. It is preferable that the cathode active material is a complex metal oxide such as cobalt oxide, manganese oxide, nickel oxide, lithium oxide, or a combination thereof. solid-solution rate between the metals may be various, and an element such as Mg, Al, Co, K, Na, Ca, Si, Ti, Sn, V, Ge, Ga, B, As, Zr, Mn, Cr, Fe, Sr, V, rare earth element, or a combination thereof may be further contained in addition to the above-mentioned metals. As a specific example of the cathode active material, a compound represented by the following Chemical Formula 15 may be used:

[Chemical Formula 15]

$Li_aA_{1-b}B_bD_2$ (where, $0.90 \leq a \leq 1.8$ and $0 \leq b \leq 0.5$); $Li_aE_{1-b}B_bO_{2-c}D_c$ (where, $0.90 \leq a \leq 1.8$, $0 \leq b \leq 0.5$, and $0 \leq c \leq 0.05$); $LiE_{2-b}B_bO_{4-c}D_c$ (where, $0 \leq b \leq 0.5$ and $0 \leq c \leq 0.05$); $Li_aNi_{1-b-c}Co_bB_cD_\alpha$ (where, $0.90 \leq a \leq 1.8$, $0 \leq b \leq 0.5$, $0 \leq c \leq 0.05$, and $0 \leq \alpha \leq 2$); $Li_aNi_{1-b-c}Co_bB_cO_{2-\alpha}F_\alpha$ (where, $0.90 \leq a \leq 1.8$, $0 \leq b \leq 0.5$, $0 \leq c \leq 0.05$, and $0 \leq \alpha \leq 2$); $Li_aNi_{1-b-c}Co_bB_cO_{2-\alpha}F_2$ (where, $0.90 \leq a \leq 1.8$, $0 \leq b \leq 0.5$, $0 \leq c \leq 0.05$, and $0 \leq \alpha \leq 2$); $Li_aNi_{1-b-c}Mn_bB_cD_\alpha$ (where, $0.90 \leq a \leq 1.8$, $0 \leq b \leq 0.5$, $0 \leq c \leq 0.05$, and $0 \leq \alpha \leq 2$); $Li_aNi_{1-b-c}Mn_bB_cO_{2-\alpha}F_\alpha$ (where, $0.90 \leq a \leq 1.8$, $0 \leq b \leq 0.5$, $0 \leq c \leq 0.05$, and $0 \leq \alpha \leq 2$); $Li_aNi_{1-b-c}Mn_bB_cO_{2-\alpha}F_2$ (where, $0.90 \leq a \leq 1.8$, $0 \leq b \leq 0.5$, $0 \leq c \leq 0.05$, and $0 \leq \alpha \leq 2$); $Li_aNi_bE_cG_dO_2$ (where, $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where, $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where, $0.90 \leq a \leq 1.8$ and $0.001 \leq b \leq 0.1$); $Li_aMnG_bO_2$ (where, $0.90 \leq a \leq 1.8$ and $0.001 \leq b \leq 0.1$); $Li_aMn_2G_bO_2$ (where, $0.90 \leq a \leq 1.8$ and $0.001 \leq b \leq 0.1$); $Li_aMn_2G_bO_4$ (where, $0.90 \leq a \leq 1.8$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $LiFePO_4$, or a combination thereof.

In the Chemical Formula 15, A may be Ni, Co, Mn, or a combination thereof; B may be Al, Ni, Co, Mn, Cr, Fe, Mg, Sr, V, a rare earth element, or a combination thereof; D may be O, F, S, P, or a combination thereof; E may be Co, Mn, or a combination thereof; F may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

The anode contains an anode active material capable of intercalating and deintercalating lithium ions. The anode active material may include (i) a carbon material such as crystalloid carbon, amorphous carbon, carbon complex, a carbon fiber, or the like, or (ii) a lithium metal, an alloy of lithium and another element, or the like may be used. Examples of the amorphous carbon may include hard carbon, coke, mesocarbon microbead (MCMB) sintered at a temperature of 1500° C. or less, mesophase pitch-based carbon fiber (MPCF), and the like. Examples of the crystalloid carbon include graphite based materials, more specifically, natural graphite, graphitized coke, graphitized MCMB, graphitized MPCF, and the like. As the carbon material, a material of which an interplanar distance is 3.35 to 3.38 Å and a crystallite size Lc measured by X-ray diffraction is at least 20 nm or more may be preferable. Another element forming the alloy with lithium may be aluminum, zinc, bismuth, cadmium, antimony, silicon, lead, tin, gallium, or indium.

The cathode or anode may be prepared by dispersing an electrode active material, a binder, and a conductive material, and a thickener, if necessary, in a solvent to prepare an electrode slurry composition, and applying this electrode slurry composition onto an electrode current collector. As a cathode current collector, aluminum, an aluminum alloy, or the like, may be generally used. As an anode current collector, copper, a copper alloy, or the like, may be generally used. The cathode current collector and the anode current collector have a foil or mesh shape.

The binder is a material playing a role in paste formation of the active material, adhesion between the active materials, adhesion with the current collector, and a buffering effect on expansion and contraction of the active material, and the like. Examples of the binder may include polyvinylidene fluoride (PVdF), polyhexafluoropropylene-polyvinylidene fluoride copolymer (PVdF/HFP), poly(vinylacetate), polyvinyl alcohol, polyethyleneoxide, polyvinylpyrrolidone, alkylated polyethyleneoxide, polyvinyl ether, poly(methylmethacrylate), poly(ethylacrylate), polytetrafluoroethylene, polyvinylchloride, polyacrylonitrile, polyvinylpyridine, styrene-butadiene rubbery acrylonitrile-butadiene rubber, and the like. A content of the binder is 0.1 to 30 wt %, preferably 1 to 10 wt %, based on the electrode active material. When the content of the binder is excessively low for example, less than 0.1 adhesive force between the electrode active material and the current collector may become insufficient. When the content is excessively high for example, over 30 wt %, adhesive force may be improved, but a content of the electrode active material is decreased in accordance with the content of the binder. This is disadvantageous in allowing the battery to have high capacity.

The conductive material is used to impart conductivity to the electrode, and any electronic conductive material may be used as long as it does not cause a chemical change in a battery. A graphite base conductive material, a carbon black base conductive material, and a metal based or metal compound based conductive material may be used. Examples of the graphite based conductive material may include artificial graphite, natural graphite, and the like. Examples of the carbon black based conductive material may include acetylene black, ketjen black, denka black, thermal black, channel black, and the like. Examples of the metal based or metal compound based conductive material may include tin, tin oxide, tin phosphate ($SnPO_4$), titanium oxide, potassium titanate, or a perovskite material such as $LaSrCoO_3$ and $LaSrMnO_3$. However, the conductive material is not limited thereto.

A content of the conductive material is preferably 0.1 to 10 wt % based on the electrode active material. When the content of the conductive material is less than 0.1 wt %, electrochemical properties may be deteriorated. In contrast, when the content is more than 10 wt %, energy density per weight may be decreased.

Any thickener may be used without limitation as long as it may serve to adjust a viscosity of the active material slurry. For example, carboxymethyl cellulose, hydroxymethyl cellulose, hydroxyethyl cellulose, hydroxypropyl cellulose, or the like, may be used.

As the solvent in which the electrode active material, the binder, the conductive material, and the like, are dispersed, a non-aqueous solvent or aqueous solvent may be used. Examples of the non-aqueous solvent may include N-methyl-2-pyrrolidone (NMP), dimethylformamide, dimethylacetamide, N,N-dimethylaminopropylamine, ethyleneoxide, tetrahydrofuran, or the like.

The lithium secondary battery according to an embodiment may include a separator preventing a short circuit between the cathode and the anode and providing a movement path of the lithium ion. The separator may be (i) a polyolefin based polymer membrane made of polypropylene, polyethylene, polyethylene/polypropylene, polyethylene/polypropylene/polyethylene, polypropylene/polyethylene/polypropylene, or the like, or a multilayer thereof, (ii) a micro-porous film, woven fabric or (iii) non-woven fabric. In addition, a film in which a resin having excellent stability is coated on a porous polyolefin film may be used.

The lithium secondary battery according to an embodiment may have various shapes such as a circular shape, a pouch shape, or an angular shape.

Hereinafter, examples and comparative examples will be described. However, the following example is only a preferable example, and is not limiting. Presuming that the lithium salt is entirely dissociated so that a concentration of lithium ion becomes 1 M, a base electrolyte may be formed by dissolving a corresponding amount of the lithium salt such as $LiPF_6$ in a basic solvent so as to have a concentration of 1 M.

Example 1 Synthesis of
2,2'-bis(1,3,2-benzodioxaborole) (Hereinafter,
Referred to as 'PEA04')

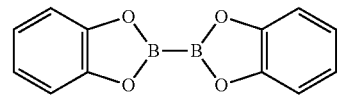 [SMILES: c1ccc2c(c1)OB(B1Oc3ccccc3O1)O2]

Tetrakis(dimethylamino)diboron (2.0 g) was put into a mixture of 1,2-dihydroxybenzen (2.4 g) and diethylether (20 mL) at room temperature. After stirring for 18 hours, dimethylamine and diethylether were removed by distillation under reduced pressure. After dissolving the product or resultant in diethylether, a temperature was lowered to 0° C., and 1 N aqueous hydrochloric acid was added thereto. After stirring for 12 hours, the product was extracted with toluene, and toluene was removed by distillation under reduced pressure. The product was washed with acetonitrile and then vacuum dried, thereby obtaining 2,2'-bis(1,3,2-benzodioxaborole (PEA04) (2.2 g).

$^1$H NMR ($CD_2Cl_2$, 500 MHz) δ7.38 (m, 4H), 7.20 (m, 4H)

Example 2 Synthesis of
Bis(Ethyleneglycolato)Diboron (Hereinafter,
Referred to as 'PEA76')

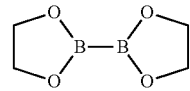

After dissolving 2.48 g of ethylene glycol (40 mmol) and 3.96 g of tetrakis(dimethylamino)diboron (20 mmol) in 20 mL of hexane in a 100 mL of a round bottom flask, a temperature was raised to 50° C. under $N_2$ atmosphere. After conducting a reaction at 50° C. for 24 hours, the temperature was lowered to room temperature. The solvent was removed by distillation under reduced pressure, and the resultant was re-crystallized with dichloromethane and hexane, thereby obtaining the PEA76 (1.9 g).

$^1$H-NMR (400 MHz, CDCl$_3$) δ: 4.07 (s, J=5.6 Hz, 8H)

Example 3 Synthesis of [2,2']bi[[1,3,2]dioxaborinanyl] (Hereinafter, Referred to as 'PEA75')

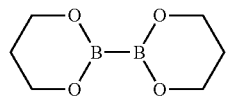

After dissolving 3.08 g of 1,3-propanediol (40 mmol) and 3.96 g of tetrakis(dimethylamino)diboron (20 mmol) in 20 mL of hexane in a 100 mL of a round bottom flask, a temperature was raised to 50° C. under $N_2$ atmosphere. After conducting a reaction at 50° C. for 24 hours, the temperature was lowered to room temperature. The solvent was removed by distillation under reduced pressure, and the resultant was re-crystallized with dichloromethane and hexane, thereby obtaining the PEA75 (2.5 g).

$^1$H-NMR (400 MHz, CDCl$_3$) δ: 3.95 (t, J=5.6 Hz, 8H), 1.94 (quin, J=5.2 Hz, 4H)

Example 4 Synthesis of 5,5,5',5'-tetramethyl-2,2'-bi(1,3,2-dioxaborinane) (Hereinafter, Referred to as 'PEA66')

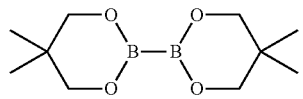

After dissolving 4.17 g of 2,2'-dimethyl-1,3-propanediol (40 mmol) and 3.96 g of tetrakis(dimethylamino)diboron (20 mmol) in 30 mL of toluene in a 100 ml of a round bottom flask, a temperature was raised to 50° C. under $N_2$ atmosphere. After conducting a reaction at 50° C. overnight, the temperature was lowered to room temperature. After filtering a crystal formed at room temperature, the filtrate was vacuum-dried, thereby obtaining PEA66 (2.8 g).

$^1$H-NMR (400 MHz, CDCl$_3$) δ: 3.57 (s, 8H), 0.92 (s, 12H)

Example 5 Synthesis of 4,4,4',4',5,5,5',5'-octakis(trifluoromethyl)-2,2'-bi(1,3,2-dioxaborolane) (Hereinafter, Referred to as 'PEA69')

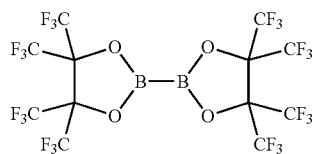 [SMILES: FC(F)(F)C1(C(F)(F)F)OB(B2OC(C(F)(F)F)(C(F)(F)F)C(C(F)(F)F)(C(F)(F)F)O2)OC1(C(F)(F)F)C(F)(F)F]

After dissolving 13.4 g of hexafluoro-2,3-bis(trifluoromethyl)-2,3-butanediol (40 mmol) and 3.96 g of tetrakis(dimethylamino)diboron (20 mmol) in 30 mL of toluene in a 100 mL of a round bottom flask, a temperature was raised to 50° C. under $N_2$ atmosphere. After conducting a reaction at 50° C. for 24 hours, the temperature was lowered to room temperature. After filtering the crystal formed at room temperature, the filtrate was vacuum-dried, thereby obtaining the PEA69 (12 g).

Example 6 Synthesis of (4R,4'R,5R,5'R)-tetraisopropyl [2,2'-bi(1,3,2-dioxaborolane)]-4,4',5,5'-tetracarboxylate (Hereinafter, Referred to as 'PEA74')

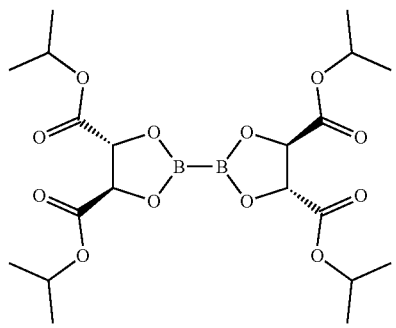 [SMILES: CC(C)OC(=O)[C@@H]1OB(B2O[C@@H](C(=O)OC(C)C)[C@H](C(=O)OC(C)C)O2)O[C@H]1C(=O)OC(C)C]

After dissolving 9.37 g of diisopropyl-L-tartrate (40 mmol) and 3.96 g of tetrakis(dimethylamino)diboron (20 mmol) in 30 mL of toluene in a 100 mL of a round bottom flask, a temperature was raised to 50° C. under $N_2$ atmosphere. After conducting a reaction at 50° C. overnight, the temperature was lowered to room temperature. After toluene was removed by distillation under reduced pressure, the resultant was vacuum-dried, thereby obtaining the PEA74 (9.5 g).

$^1$H-NMR (400 MHz, CDCl$_3$) δ: 4.93 (sep, J=6.8 Hz, 4H), 4.77 (s, 4H), 1.32 (d, J=6.8 Hz, 24H)

Comparative Example 1 Synthesis of Bis(Pinacolato)Diboron (Hereinafter, Referred to as 'PEA03')

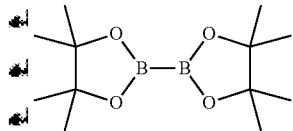

Tetrakis(dimethylamino)diboron (2.0 g) was put into a mixture of anhydrous pinacol (2.4 g) and diethylether (20 mL). After stirring for 18 hours, dimethylamine and diethylether were removed by distillation under reduced pressure. Colorless solid bis(pinacolato)diboron (2.2 g) was obtained by vacuum sublimation purification.

$^1$H NMR (CDCl$_3$, 500 MHz) δ 1.26 (s, 24H)

Examples 7 to 19 and Comparative Examples 2 to 5

A solvent obtained by dissolving LiPF$_6$ in a mixed solvent in which ethylene carbonate (EC) and ethyl methyl carbonate (EMC) were mixed at a volume ratio of 3:7 so as to have a concentration of 1.0 M was used as a basic electrolyte (1 M $LiPF_6$, EC/EMC=3:7). Various electrolytes are prepared as shown in the following Table 1.

A battery in which the non-aqueous electrolyte was applied was manufactured as follows.

After mixing $LiNiCoMnO_2$ and $LiMn_2O_4$ at a weight ratio of 1:1 as a cathode active material, the active material, polyvinylidene fluoride (PVdF) as a binder, and carbon as a conductive material were mixed at a weight ratio of 92:4:4 and then dispersed in N-methyl-2-pyrrolidone, thereby preparing cathode slurry. This slurry was coated on aluminum foil having a thickness of 20 μm, dried, and rolled, thereby preparing a cathode. Artificial graphite as an anode active material, styrene-butadiene rubber as a binder, and carboxymethyl cellulose as a thickener were mixed at a weight ratio of 96:2:2 and then, dispersed in water, thereby preparing anode active material slurry. This slurry was coated on aluminum foil having a thickness of 15 μm, dried, and rolled, thereby preparing art anode.

A film separator made of a polyethylene (PE) material and having a thickness of 25 μm was stacked between the prepared electrodes, and a cell was configured using a pouch having a size of 8 mm×270 mm×185 mm (thickness× length×width), followed by injection of the non-aqueous electrolyte, thereby manufacturing a 25 Ah-capacity lithium secondary battery for an electric vehicle (EV).

Performance of the 25 Ah-class lithium secondary battery for an electric vehicle (EV) manufactured as described above was evaluated as follows. Evaluation items are as follows.

[Evaluation Item]

1. 1 C discharge capacity (−20° C.): After charging the battery at room temperature for 3 hours (25 A, 4.2 V CC-CV), the battery was left at −20° C. for 4 hours, and then the battery was discharged to 2.7 V (25 A, CC). Thereafter, usable capacity (%) with respect to the initial capacity was measured. See Table 1.

2. Capacity recovery rate after 30 days at 60° C.: After charging the battery at room temperature for 3 hours (25 A, 4.2 V CC-CV), the battery was released at 60° C. for 30 days, and then, the battery was discharged to 2.7 V (25 A, CC). Thereafter, recovery rate (%) with respect to initial capacity was measured. See Table 1.

3. Thickness increase rate after 30 days at 60° C.: When a thickness of the battery after charging the battery at room temperature for 3 hours (25 A, 4.4 V CC-CV) was defined as A, and a thickness of the battery left at 60° C. using a closed thermostatic device for 30 days at an atmospheric pressure was defined as B, a thickness increase rate was calculated by the following Equation 1. See Table 1.

$$(B-A)/A \times 100 (\%) \quad \text{[Equation 1]}$$

4. Lifespan at room temperature: A process of charging the battery at room temperature (50 A, 4.2V, CC-CV) and then discharging the battery to 2.7V (25 A) was repeated 500 times. In this case, discharge capacity at the first discharge was defined as C, and discharge capacity at the 300th discharge was divided by the discharge capacity C at the first discharge, thereby calculating a capacity retention rate during the lifespan. See Table 1.

TABLE 1

| | Electrolyte composition | Capacity recovery rate | Thickness increase rate | Capacity retention rate during lifespan | Discharge capacity (−20° C.) |
|---|---|---|---|---|---|
| | | After 30 days At 60° C. | | | |
| Example 7 | Basic electrolyte + PEA04 1 wt % | 81% | 12% | 81% | 83% |
| Example 8 | Basic electrolyte + PEA04 0.5 wt % | 91% | 14% | 85% | 76% |
| Example 9 | Basic electrolyte + PEA04 3 wt % | 76% | 9% | 74% | 72% |
| Example 10 | Basic electrolyte + PEA04 1 wt % + VC 1 wt % | 87% | 9% | 87% | 77% |
| Example 11 | Basic electrolyte + PEA04 1 wt % + VC 0.5 wt % + PS 0.5 wt % | 88% | 2% | 88% | 72% |
| Example 12 | Basic electrolyte + PEA04 1 wt % + VC 0.5 wt % + LiBOB 0.5 wt % | 89% | 4% | 91% | 78% |
| Example 13 | Basic electrolyte + PEA66 1 wt % | 75% | 9% | 83% | 88% |
| Example 14 | Basic electrolyte + PEA69 1 wt % | 81% | 7% | 84% | 84% |
| Example 15 | Basic electrolyte + PEA74 1 wt % | 85% | 4% | 88% | 86% |
| Example 16 | Basic electrolyte + PEA75 1 wt % | 78% | 8% | 81% | 85% |
| Example 17 | Basic electrolyte + PEA76 1 wt % | 75% | 10% | 78% | 78% |
| Example 18 | Basic electrolyte + PEA74 1 wt % + VC 0.5 wt % + PS 0.5 wt % | 91% | 1% | 91% | 82% |
| Example 19 | Basic electrolyte + PEA74 1 wt % + VC 0.5 wt % + LiBOB 0.5 wt % | 89% | 2% | 92% | 84% |
| Comparative Example2 | Basic electrolyte | 37% | 30% | 20% | 55% |
| Comparative Example 3 | Basic electrolyte + VC 1 wt % + PS 1 wt % | 60% | 12% | 61% | 48% |
| Comparative Example4 | Basic electrolyte + PEA03 1 wt % | 12% | 50% | 54% | 89% |
| Comparative Example5 | Basic electrolyte + PEA03 1 wt % + VC 0.5 wt % + PS 0.5 wt % | 28% | 35% | 61% | 60% |

Basic Electrolyte: 1M $LiPF_6$, EC/EMC = 3:7
LiBOB: Lithium-bis(Oxalato)Borate
VC: Vinylene carbonate
PS: 1,3-propane sultone As shown in Table 1, it may be appreciated that the lithium secondary battery containing the electrolyte for a lithium secondary battery according to an embodiment had a high capacity recovery rate after 30 days at 60° C., and the thickness increase rate was significantly low.

On the contrary, it may be appreciated that the electrolyte for a secondary battery that did not contain the boron derivative according to an embodiment had a low high temperature capacity recover rate and the thickness increase rate was also significantly high (30%) such that stability was deteriorated.

In addition, the secondary battery using the electrolyte containing the compound of Comparative Example 1 having a different structure from that of the boron derivative according to an embodiment has a slightly high low-temperature discharge capacity, but high temperature storage stability was low.

In the case of using the commercialized compound (Allychem Co. LTD., purity: 99%) of Comparative Example 1, at the time of adding the compound, the electrolyte was changed to brown, such that it may be judged that the compound of Comparative Example 1 was chemically slightly unstable. At the time of a high temperature stability experiment, the compound of Comparative Example 1 was decomposed such that the compound may not improve high temperature stability.

Therefore, the boron derivative represented by Chemical Formula 1 according to an embodiment was stable compared with the compound of Comparative Example 1 such that the boron derivative may improve high temperature stability and low temperature discharge capacity.

In addition, the electrolyte for a lithium secondary battery according to an embodiment further contains an additive such as lithium bis(oxalate)borate (LiB($C_2O_4$)$_2$, LiBOB), vinylene carbonate (VC), vinyl ethylene carbonate (VEC), ethylene sulfite, ethane sultone, propane sultone (PS), and a combination thereof, in addition to the boron derivative represented by Chemical Formula 1 according to an embodiment, such that high temperature storage stability, low temperature discharge capacity, and lifespan characteristics may be further improved. Therefore, the lithium secondary battery containing the electrolyte for a lithium secondary battery according to an embodiment may have significantly high efficiency, stability and excellent lifespan characteristics.

The electrolyte for a lithium secondary battery according to an embodiment contains the boron derivative, such that a swelling phenomenon in which the battery is swelled at a high temperature may be significantly decreased, such that the electrolyte may have excellent high temperature storage characteristics.

Additionally, the electrolyte for a lithium secondary battery according to an embodiment contains a boron derivative that is chemically stable, that is, more stable than bis(pinacholato)diborone of which all substituents are alkyl, such that low temperature discharge capacity as well as a high temperature capacity retention rate may be significantly increased.

Further, the electrolyte for a lithium secondary battery according to an embodiment further contains an additive such as the oxalatoborate based compounds, the carbonate based compounds substituted with fluorine, the vinylidene carbonate based compounds, the sulfinyl group containing compounds, and a combination thereof, as well as the boron derivative represented by Chemical Formula 1, such that more excellent lifespan characteristics, high temperature stability, and low temperature characteristics may be implemented.

Furthermore, the lithium secondary battery according to an embodiment uses the electrolyte for a lithium secondary battery according to an embodiment, containing the boron derivative, such that the lithium secondary battery has excellent high temperature storage stability and low temperature characteristics while maintaining excellent basic performance such as high efficiency charge and discharge characteristics, lifespan characteristics, and the like.

What is claimed is:

1. A lithium secondary battery having a thickness increase rate of 1% to 15% after 30 days at 60° C. and comprising:
    an anode comprising an anode active material capable of intercalating and deintercalating lithium ions;
    a cathode comprising a cathode active material capable of intercalating and deintercalating lithium ions;
    a separator preventing a short circuit between the anode and the cathode; and
    an electrolyte comprising a lithium salt, a non-aqueous organic solvent, and a boron derivative represented by the following Chemical Formula 2, 4 or 5:

[Chemical Formula 2]

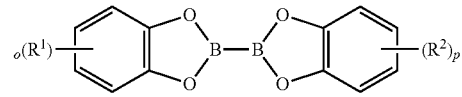

[Chemical Formula 4]

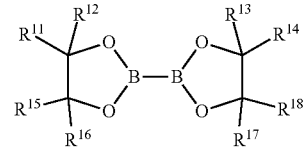

[Chemical Formula 5]

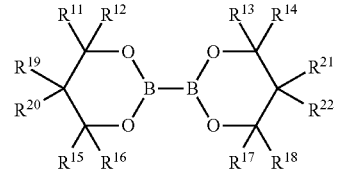

wherein in Chemical Formula 2 each of $R^1$ and $R^2$ is independently hydrogen, cyano, hydroxyl, halogen, halo(C1-C10)alkyl, (C1-C10)alkyl, (C1-C10)alkoxy, (C1-C10)alkoxycarbonyl, or (C6-C12)aryl, wherein each of o and p is independently an integer of 1 to 4, wherein, when o is 2 or more, the two or more $R^1$ are the same as or different from each other, and wherein, when p is 2 or more, the two or more $R^2$ are the same as or different from each other, wherein in Chemical Formula 4 each of $R^{11}$ to $R^{18}$ is independently hydrogen, or (C1-C10)alkoxycarbonyl, and at least one of $R^{11}$ to $R^{18}$ is (C1-C10)alkoxycarbonyl, wherein in Chemical Formula 5 each of $R^{11}$ to $R^{22}$ is independently hydrogen, halo(C1-C10) alkyl, (C1-C10) alkyl, or (C1-C10)alkoxycarbonyl, and wherein the boron derivative excludes the material represented by Chemical Formula 5 of which all of $R^{11}$ to $R^{22}$ are (C1-C10) alkyl.

2. The lithium secondary battery of claim 1, wherein each of $R^1$ and $R^2$ is independently hydrogen or (C1-C10) alkyl.

3. The lithium secondary battery of claim 1, wherein the boron derivative is selected from the group consisting of the following structures:

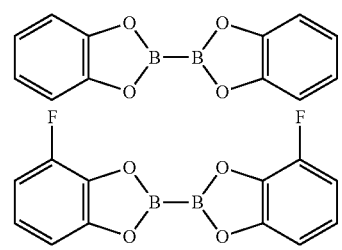

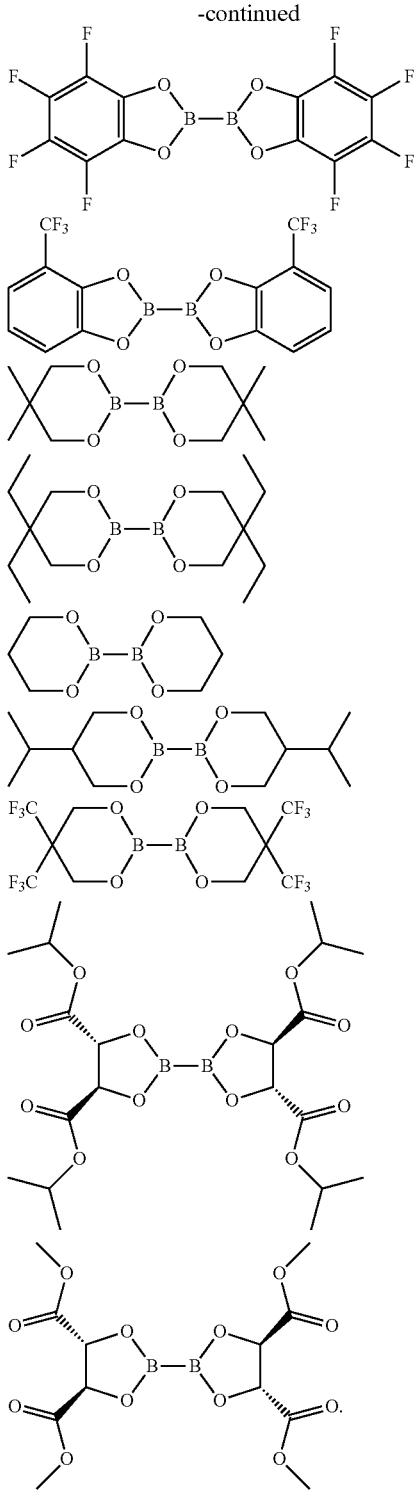

4. The lithium secondary battery of claim 1, wherein the content of the boron derivative is 0.1 wt % to 5 wt % based on the total weight of the electrolyte.

5. The lithium secondary battery of claim 1, wherein the electrolyte further comprises:
a first additive selected from the group consisting of oxalatoborate based compounds, carbonate based compounds substituted with fluorine, vinylidene carbonate based compounds, sulfinyl group-containing compounds, and a combination thereof.

6. The lithium secondary battery of claim 5, wherein the electrolyte further comprises:
a second additive selected from the group consisting of lithium difluoro(oxalate)borate (LiFOB), lithium bis(oxalate)borate (LiB(C$_2$O$_4$)$_2$, LiBOB), fluoroethylene carbonate (FEC), vinylene carbonate (VC), vinyl ethylene carbonate (VEC), divinyl sulfone, ethylene sulfite, propylene sulfite, diallyl sulfonate, ethane sultone, propane sultone (PS), butane sultone, ethene sultone, butene sultone, propene sultone (PRS), and a combination thereof.

7. The lithium secondary battery of claim 5, wherein the content of the first additive is 0.1 wt % to 5.0 wt % based on the total weight of the electrolyte.

8. The lithium secondary battery of claim 1, wherein the non-aqueous organic solvent is selected from the group consisting of cyclic carbonate-based solvent, linear carbonate-based solvent, and a combination thereof.

9. The lithium secondary battery of claim 8, wherein the cyclic carbonate-based solvent includes a compound selected from the group consisting of ethylene carbonate, propylene carbonate, butylene carbonate, vinylene carbonate, vinyl ethylene carbonate, fluoroethylene carbonate, and a mixture thereof, and
wherein the linear carbonate-based solvent includes a compound selected from the group consisting of dimethyl carbonate, diethyl carbonate, dipropyl carbonate, ethyl methyl carbonate, methyl propyl carbonate, methyl isopropyl carbonate, ethyl propyl carbonate, and a mixture thereof.

10. The lithium secondary battery of claim 8, wherein the non-aqueous organic solvent is a mixture of the linear carbonate-based solvent and the cyclic carbonate-based solvent, and
wherein the mixed volume ratio of the linear carbonate-based solvent:the cyclic carbonate-based solvent is 1 to 9:1.

11. The lithium secondary battery of claim 1, wherein the lithium salt is selected from the group consisting of LiPF$_6$, LiBF$_4$, LiClO$_4$, LiSbF$_6$, LiAsF$_6$, LiN(SO$_2$C$_2$F$_5$)$_2$, LiN(CF$_3$SO$_2$)$_2$, LiN(SO$_3$C$_2$F$_5$)$_2$, LiN(SO$_2$F)$_2$, LiCF$_3$SO$_3$, LiC$_4$F$_9$SO$_3$, LiC$_6$H$_9$SO$_3$, LiSCN, LiAlO$_2$, LiAlCl$_4$, LiCl, LiI, LiB(C$_2$O$_4$)$_2$, and a combination thereof.

12. The lithium secondary battery of claim 1, wherein the concentration of the lithium salt is 0.1 M to 2.0 M in the electrolyte.

13. An electrolyte for a lithium secondary battery, the electrolyte comprising a lithium salt, a non-aqueous solvent and a boron derivative represented by the following Chemical Formulas:

[Chemical Formula 2]

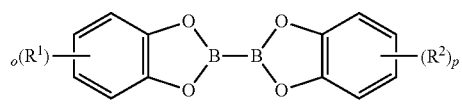

[Chemical Formula 4]

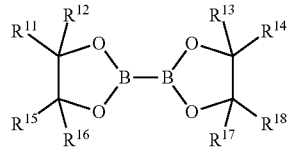

-continued

[Chemical Formula 5]

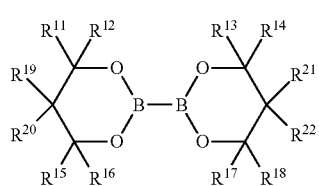

wherein in Chemical Formula 2 each of $R^1$ and $R^2$ is independently hydrogen, cyano, hydroxyl, halogen, halo(C1-C10)alkyl, (C1-C10)alkyl, (C1-C10)alkoxy, (C1-C10)alkoxycarbonyl, or (C6-C12)aryl, wherein each of o and p is independently an integer of 1 to 4, wherein, when o is 2 or more, the two or more $R^1$ are the same as or different from each other, wherein, when p is 2 or more, the two or more $R^2$ are the same as or different from each other, wherein in Chemical Formula 4 each of $R^{11}$ to $R^{18}$ is independently hydrogen, or (C1-C10)alkoxycarbonyl, and at least one of $R^{11}$ to $R^{18}$ is (C1-C10)alkoxycarbonyl, wherein in Chemical Formula 5 each of $R^{11}$ to $R^{22}$ is independently hydrogen, halo(C1-C10) alkyl, (C1-C10) alkyl, or (C1-C10)alkoxycarbonyl, and wherein the boron derivative excludes the material represented by Chemical Formula 5 of which all of $R^{11}$ to $R^{22}$ are (C1-C10) alkyl.

14. The electrolyte of claim 13, wherein each of $R^1$ and $R^2$ is independently hydrogen or (C1-C10)alkyl.

* * * * *